United States Patent
Johnson

(10) Patent No.: US 7,475,729 B2
(45) Date of Patent: Jan. 13, 2009

(54) METHOD FOR CONSTRUCTION AND COMPLETION OF INJECTION WELLS

(75) Inventor: Michael H. Johnson, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 286 days.

(21) Appl. No.: 10/517,096

(22) PCT Filed: Jun. 6, 2003

(86) PCT No.: PCT/US03/17840

§ 371 (c)(1),
(2), (4) Date: Sep. 28, 2005

(87) PCT Pub. No.: WO03/104611

PCT Pub. Date: Dec. 18, 2003

(65) Prior Publication Data

US 2006/0048939 A1 Mar. 9, 2006

Related U.S. Application Data

(60) Provisional application No. 60/387,158, filed on Jun. 6, 2002.

(51) Int. Cl.
*E21B 43/10* (2006.01)
*E21B 43/25* (2006.01)
(52) U.S. Cl. .................. 166/305.1; 166/269; 166/100
(58) Field of Classification Search .............. 166/100, 166/281, 305.1, 308.1, 269
See application file for complete search history.

(56) References Cited

U.S. PATENT DOCUMENTS

| 3,924,677 A | * | 12/1975 | Prenner et al. ............. 166/100 |
| 5,228,518 A | | 7/1993 | Wilson et al. |
| 5,425,424 A | * | 6/1995 | Reinhardt et al. ........... 166/291 |
| 5,829,520 A | * | 11/1998 | Johnson ................. 166/250.01 |
| 6,070,663 A | * | 6/2000 | Cernocky et al. ........ 166/272.3 |
| 6,631,764 B2 | | 10/2003 | Parlar et al. |
| 6,708,763 B2 | * | 3/2004 | Howard et al. ............. 166/303 |
| 2003/0029612 A1 | * | 2/2003 | Burd et al. .................. 166/269 |

FOREIGN PATENT DOCUMENTS

WO 97/49894 12/1997

* cited by examiner

*Primary Examiner*—Shane Bomar
(74) *Attorney, Agent, or Firm*—Steve Rosenblatt

(57) ABSTRACT

A method for well construction and completion is disclosed. Generally the method comprises the steps of 1) drilling through an injection zone, 2) positioning an extendable permeable element on the casing capable of stopping formation material from entering the well bore, 3) positioning the casing such that the extendable elements are aligned with the injection zone, 4) extending the member such that they come into direct contact with the injection zone formation, 5) running tubing/completion equipment, and 6) begin injecting the desired fluids into the well. Thus eliminating the need to perforate and gravel pack the well while improving reliability of the injection well completion.

19 Claims, 7 Drawing Sheets

METHOD FOR CONSTRUCTION AND COMPLETION OF INJECTION WELLS

RELATED APPLICATIONS

This application claims provisional priority to U.S. Provisional Patent Application Ser. No. 60/387,158, filed 6 Jun. 2002.

BACKGROUND OF THE INVENTION

1. Field of the Invention

This invention relates to a method of drilling and completing a well.

More particularly, this invention relates to a method for placing a means of communication between an injection zone and the well borehole without perforating and gravel packing. The method focuses on improving the reliability over current methods of sand control used in injection wells and will also reduce time, improve safety, and reduce costs.

2. Description of the Related Art

The need for reliable injection well completions crosses industry boundaries. Highly corrosive or toxic industrial wastes from chemical plants, fluids from mining operations, water from hydrocarbon production, and cooling water from power plants can be safely disposed of in subterranean formations. However, the injection well completions these wastes are injected into need to be reliable to ensure the safety of employees, surrounding communities, and the environment. Also, reliability is required to ensure that production of chemicals, minerals, and energy can continue without interruption should an injection well completion failure occur. The cost of a failed injection well can be very high, not just in financial terms, but in terms of human and environmental risk. Because of the tangible and intangible costs associated with an injection well failure, it is important that injection wells be as reliable as possible. Also, it is important to seek ways to reduce the time spent on injection well construction and completion operations to minimize cost. Also, if the number of personnel and the amount of equipment can be reduced during injection well completion operations safety inherently improves.

Many injection zones are by their very nature weak or unconsolidated rock and/or sandstone. These weak formations contain formation particles and other debris which can slough into the well borehole and negatively affect the injectivity of the well. There has been much effort and focus on preventing formation sloughing in production wells. Water wells and hydrocarbon production wells have been the primary focus of study in regard to sand production or formation sloughing. The same means of preventing formation sloughing in production wells have been applied to injection wells throughout the years.

One common method of injection well construction and completion is to install a gravel pack to control formation sloughing. A gravel pack is a two stage filter that consists of a sized screen and sized sand. The sized sand stops sloughing of the formation matrix and the screen keeps the sized sand in place. A typical method would be to drill a borehole with conventional drilling fluids, run casing into the borehole and cement the casing in place, displace the conventional drilling fluids with a clear brine, filter the brine and clean the borehole, run perforating guns in the well and perforate the casing, remove the perforating guns and re-clean the casing, re-filter to the clear brine fluids, run in the well with a gravel pack screen assembly, use high-pressure pumps place sized sand between the sized screen assembly out into the perforation tunnels and against the formation face and filling the annulus between the sized screen and casing. This is a costly, time-consuming process.

There are many disadvantages from the above procedure. These disadvantages can be broken into two categories; equipment and process reliability. There have been instances where leaks have caused perforating guns to low order detonate resulting in no or poor perforating performance and expensive fishing operations to remove the damaged perforating gun bodies. Also, sized screens have failed during the high-pressure pumping operation used to place the sized sand around the screen causing additional fishing operations.

Formation damage is also a problem during injection with this type of injection well construction and completion. Conventional drilling fluids can allow filtrate and solid particles to invade the formation causing restrictions in the productive pore spaces. Another source of formation damage is the shaped charges or explosives used in perforating. The energy from these explosives pushes the casing, cement, and formation aside when creating the perforation tunnel. This causes crushing of the formation matrix reducing the permeability and limiting flow potential of injected fluids into the formation.

Another common method of injection well construction and completion is to drill a borehole and not run casing across the productive formation. This type of well construction is termed barefoot or openhole. The most common practice is to run a sized screen assembly in the openhole section and place sized sand around the screen filling the area between the screen and the formation face. The large increase in formation surface area available to accept fluid in an openhole helps improve injectivity in these types of completions when compared to cased and perforated completions.

In both openhole and cased hole completions the sized screen assembly itself can serve as the restriction in the well borehole. This may cause unnecessary pressure drops which restrict injection. Also, the sized screen may need to be removed for remedial operations. The process of removing an object from a well borehole is called fishing. These operations are costly and time consuming and not always successful resulting in a need to re-drill a portion of, or possibly the entire well. When hazardous wastes have been injected into the well, fishing can prove to be a hazard to the workers, community, and environment. Reliability is a key driver for injection well design and completion.

Keeping in mind that the methods described above were developed for production operations, the question of reliability in injection wells becomes a big issue. In the production environment, the fluid flows from the productive formation, any sloughing or movement of formation material is retained by the sized sand which in turn is retained by the sized screen. This combination yields a reliable means of preventing the formation material from sloughing into the well borehole. However, in the injection mode, fluid moves from the well borehole, through the sized screen, through the sized sand, and into the formation. If the sized sand is pumped away from the sized screen, formation material is free to move into the well borehole through the sized screen. There are several possible mechanisms which would cause the size sand to be displaced from the sized screen.

In both types of completions, openhole and cased hole, formation damage can restrict injection into the well. The may also be times when it is desirable to inject larger volumes of fluids into the well at high injection rates. If the desired injection rate and pressure exceeds the formation fracture pressure, the formation matrix parts and a fissure opens.

When the formation is fractured, the surface area of the injection zone increases along the part or fracture face. This allows the fluid to enter the formation at the desired pump in rate. A detrimental side effect of fracturing the formation is that the sized sand, which was placed around the screen as an essential component of the gravel pack filter, is pumped away from the screen into the fissure which developed as the formation matrix is fractured. When this occurs the formation can slough into the well borehole through the sized screen.

Acid is sometimes used in injection wells to improve fluid infectivity into a formation. The acid can, in some cases, dissolve enough of the formation matrix to allow the sized sand to be pumped away from the screen allowing formation material to enter the well borehole. In some cases the injected fluid being pumped into the well borehole causes a redistribution of the formation matrix which can cause the formation matrix to compact or rearrange in such a manner as to allow the sized sand to be pumped away from the sized screen. Any operation which causes the slightest void in the sized sand can lead to formation sloughing and loss of injectivity into the well.

Devices which eliminate perforating and gravel packing have been introduced for application in hydrocarbon production wells. U.S. Pat. No. 3,347,317 to Zandmer disclosed an extendable duct with solid particles acting as a gravel pack median. WO9626350 to Johnson disclosed an extendable. These devices have not been widely used in hydrocarbon production. These devices trap drilling mud filter cake between the sand control filter media and formation face which limit productivity due to plugging of the formation and filter media. In another invention targeting hydrocarbon production, U.S. Pat. No. 5,425,424 to Reinhardt disclosed no gravel pack median is used in these extendable ducts. These devices have not been adopted as an accepted practice in the hydrocarbon production because of poor productivity when applied in production wells.

For injection wells poor injectivity can be overcome by exceeding the fracture pressure of the formation as injection rate requirements dictate. By applying a preformed perforation which contains a high strength filter material, sized to prevent formation sloughing, injection well reliability will be greatly improved.

Therefore, there is a need in the art for a method of injection well construction and completion that reliably prevents the formation from sloughing into the injection well borehole, while eliminating internal diameter restrictions associated with the sized screens.

SUMMARY OF THE INVENTION

The present invention provides a method of injection well construction and completion including the steps of drilling a productive interval or formation and positioning a laterally extendable assembly containing a filter media on a casing so that when the casing is run the extendable assembly is aligned with an injection zone. The method also includes the steps of extending the member so that it comes into direct contact with the injection zone of the productive interval, running production tubing/equipment into the well and injecting fluids into and through the extendable assemblies and into the injection zone of the productive formation of the well. The method may further include steps to cement the casing prior to injecting into the well.

The present invention provides a fluid system for injection well completion includes a borehole drilled into an injection zone of a productive internal or formation and a casing including an extendable assembly run into the borehole so that the extendable assembly is positioned adjacent a site in the interval and extends to directly contact a face of the formation at the site form an injection conduit, where the member includes a filter media within an extendable portion of the extendable assembly. The system also includes production tubing and equipment and a fluid supply system, where the fluid supply system is adapted to inject an injection fluid through the conduits in the interval. Preferably, the casing includes a plurality of extendable assemblies, each member positioned adjacent a site in the interval and extended to form a conduit between an interior of the casing and the formation through which fluids can flow. Preferably, the injection fluid is a fluid having an injection pressure below the fracture pressure of the formation; these fluids, which are used in hydrocarbon production well construction for drilling open-hole horizontal wells, are a class of drilling fluids known as "Drill-In Fluids". Conventional fluids drilling fluids maybe used; however, in most cases, the injection pressure for these fluids exceeds an injection zone fracture pressures.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
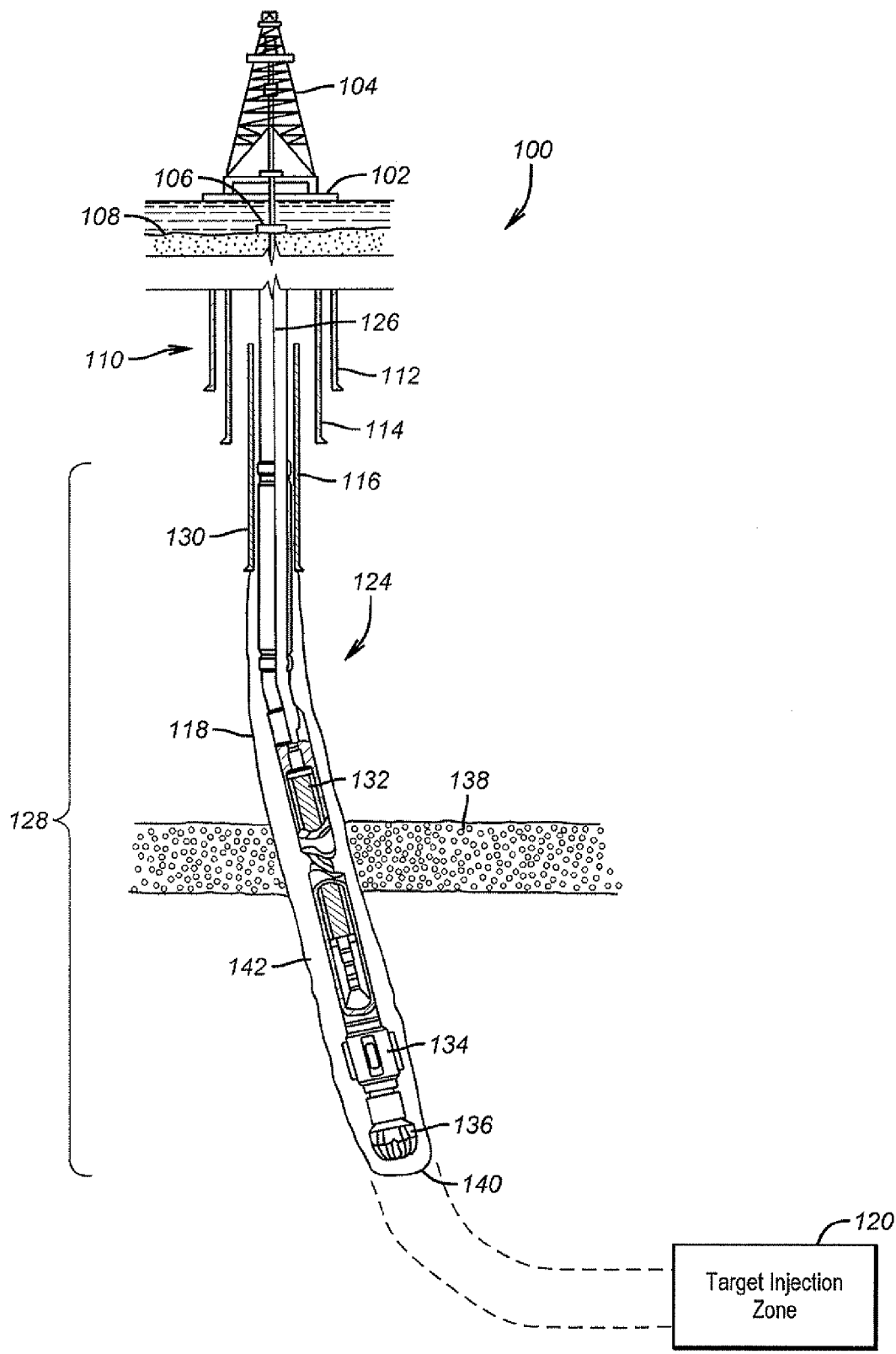
FIG. 1 is a schematic illustrating drilling an injection well to a point above the anticipated injection zones.

The inventor has developed a new injection well construction and completion method and system involving drilling into a productive formation and positioning within the productive formation a casing including at least one and preferably a plurality of extendable assemblies. After positioning the casing so that the extendable assemblies are within the productive formation and especially within an injection zone of the productive formation, the members are extended so that the distal end of the members come into direct contact with a face of the formation. Once the members are extended, the casing can be cemented in and production tubing/equipment can be run into the well. A fluid can then be pumped into the tubing so that it is forced out through the extended member into the injection zone of the productive formation.

The present invention broadly relates to a method of injection well construction and completion including the steps of drilling a borehole into a productive interval or formation and positioning a casing including at least one laterally extendable assembly having a filter media so that the extendable assemblies can be extended forming conduits into an injection zone of the formation. The method also includes the steps of extending the members so that they come into direct contact with a formation face of the injection zone of the productive interval, running production tubing/equipment into the borehole and injecting fluids into the tubing, through the extendable assemblies and into the injection zone of the productive formation. The method may further include the step of cementing the casing prior to injecting fluids into the well.

The present invention also broadly relates to a system for a completed injection zone including a borehole including an interval within a productive formation and a casing having at least one extendable assembly run into the borehole, where the members are positioned within the interval and extended to form conduits between the casing and the interval by having a distal end of each of the members makes direct contact with a face of the formation at sites within the interval. The system also includes production tubing and equipment and a fluid supply system, where the fluid supply system is adapted to inject an injection fluid through the conduits in the interval.

Suitable injections fluids including, without limitation, any fluid capable of being injected into a well. Although conventional drilling fluids can be used, in most cases, the pressures needed to inject these fluids well exceed the injection zone fracture pressure. Preferred fluids include, without limitation, fluids disclosed in U.S. Pat. No. 5,504,062 to Johnson; U.S. Pat. No. 5,504,062 to Johnson; U.S. Pat. No. 4,620,596 to Mondshine; U.S. Pat. No. 4,369,843 to Mondshine; and U.S. Pat. No. 4,186,803 to Mondshine, incorporated herein by reference, or any other similar fluid. Those skilled in the art will recognize that the types of fluid systems disclosed in U.S. Pat. No. 5,504,062 have the ability to minimize filtrate and particle invasion into the formation. The fluids disclosed in U.S. Pat. No. 5,504,062 represent fluid formulation of particle sizes that protect the formation and flow back through conventional gravel pack media with minimal damage to a formation. These fluids have been designed for use in openhole well construction for hydrocarbon production; more particularly they are used for openhole horizontal drilling. The Mondshine fluid systems containing sized salts protect the formation during well construction and workover operations for wells used in hydrocarbon producing formations. The Mondshine fluids have been applied as drilling fluids in horizontal openhole well construction. If the Mondshine fluids were applied in this invention, a solvent could be used to reduce the filter cake particle sizes or to completely dissolve the salt particles in the filter cake. These particular fluids are of interest in the invention because the solvent may come from injected water or water based fluids injected into the injection zone. While the use of the fluids mentioned above are preferred embodiments for the inventive method, the use of these fluid systems should not be interpreted as a limitation. As new polymers and fluid formulations are tested and become available in the market which protect the formation and have the ability to be dissolved to allow for maximum injectivity. These fluids, which are used in hydrocarbon production well construction for drilling openhole horizontal wells, are a class of drilling fluids known as "Drill-In Fluids".

The injection zones can be identified during well construction by utilizing logging while drilling tools or openhole electric logs. These tools identify the permeable formations depth and thickness of the injection zones. The extendable assemblies which will replace the perforation and gravel pack completion are spaced out on the casing string to allow them to be aligned within the injection zones as determine by the well logs. Depending on the expected injectivity requirements of the formation generally between 1 and 20, preferably between 1 and 12 extendable assemblies per foot may be required to minimize well borehole injection pressures. In many cases, 4 extendable assemblies per foot will be adequate. The casing is then run into the borehole such that the extendable assemblies are positioned within the injection zones so that once extended the member directly contact the formation. The extendable assemblies are extended mechanically, electromechanically, or hydraulically sot that the members come in contact with the formation face. Also, the devices will help centralize the casing in the borehole. After member extension, the casing may then be cemented. The injection tubing/equipment is then run into the well. Depending on the type of "Drill-In Fluid" used in the drilling process, the well may be placed on injection or solvents pumped to remove the filter cake.

Referring now to FIG. 1, a drilling system, generally 100, is shown to include a drilling vessel or platform 102 having a drilling rig 104 positioned thereon. The drilling system 100 may optionally include a subsea blowout preventer stack (not shown) positioned above a well head 106 located on an ocean floor 108. The system 100 also includes a well casing strings 110 including a conductor member 112, a surface member 114, and an intermediate member 116. As is well understood by those of ordinary skill in the art, the casing strings 110 is placed in a borehole 118 and cemented in place. As is shown in FIG. 1, drilling is continuing to a target injection zone 120 within a productive formation 122 (see FIG. 2) using a drilling assembly 124. The drilling assembly 124 includes a drill string 126 and a bottom hole assembly 128. The bottom hole assembly 128 includes logging while drilling formation evaluation sensors 130, a drilling motor 132, a drill string stabilizer 134, and a drill bit 136.

Looking further at FIG. 1, the bottom hole assembly 128 has intersected a marker formation 138. The marker formation 138 is a selected geological indicator that is reached prior to intersecting the target injection zone 120. The marker formation 138 provides an indication of an additional drilling depth that needs to occur from a bottom hole position 140 to the injection zone 120. When the bottom hole position 140 is approximately 200 to 500 feet above the injection zone 120, conventional drilling mud will be displaced with a "Drill-In Fluid" selected to protect the injection zone formation 120. The "Drill-In Fluid" displaces the conventional mud by pumping the "Drill-In Fluid" into the drill string 128 and taking returns (the conventional drilling fluid) up an annulus 142 of the borehole 118.

Figure 2:
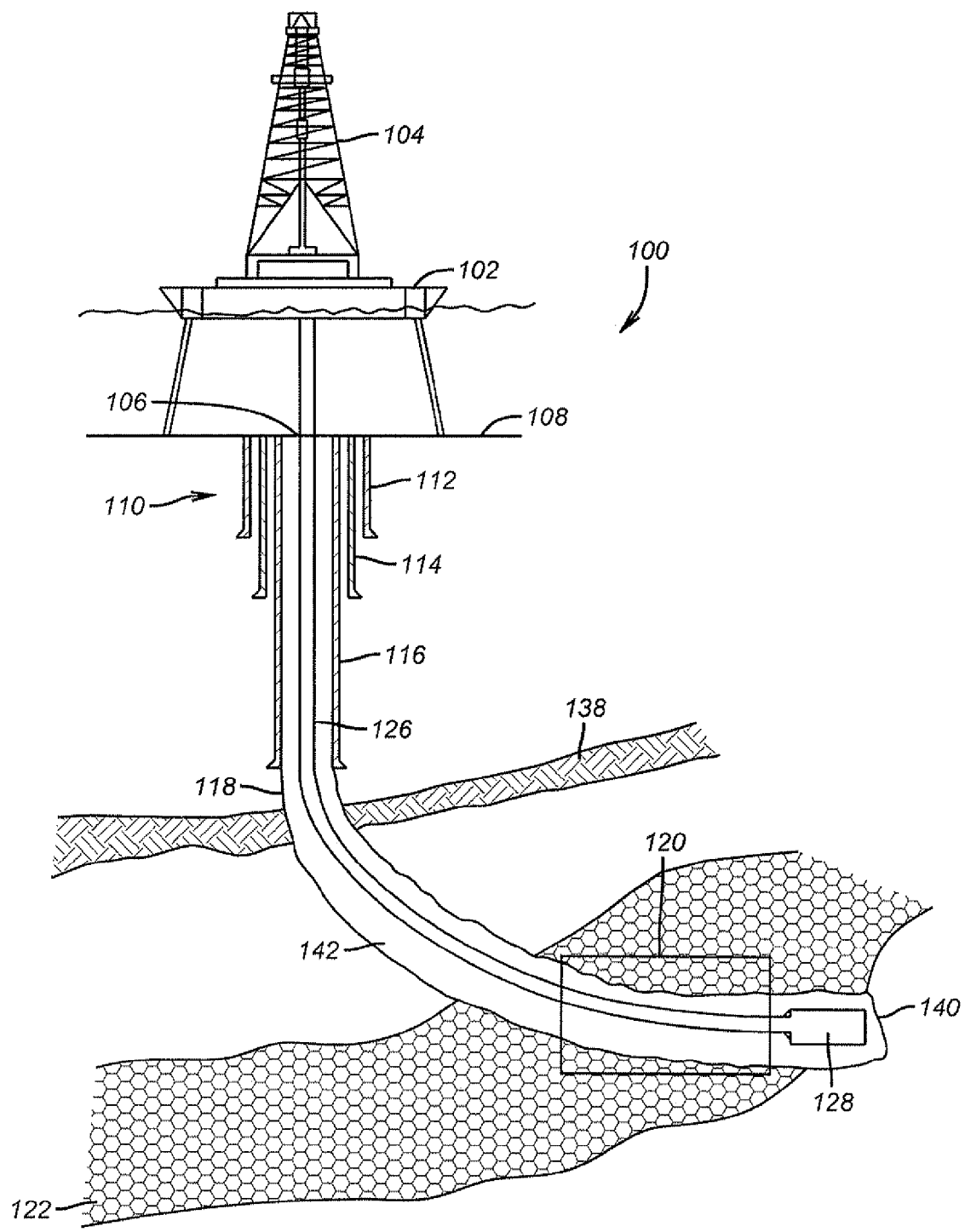
FIG. 2 is a schematic that represents drilling through the injection zone with a "Drill-In Fluid". Also shown are logging while drilling tools which can be used to determine the depth and length of injection zones.

Referring now to FIG. 2, drilling of the borehole 118 is continued and extended through the injection zone 120 using the "Drill-In Fluid". The bottom of the well 140 is now shown extended through the injection zone 120. After reaching a desired total depth, the drill string 126 and bottom hole assembly 128 are pulled from the borehole 118. Production casing 144 (see FIGS. 3-6) then is run into the well. The production casing 144 includes a plurality of extendable assemblies 146 so that when the casing 144 reaches the bottom 140 of the borehole 118 the extendable assemblies 146 are positioned within the injection zone 120 of the productive formation 122.

Figure 6:
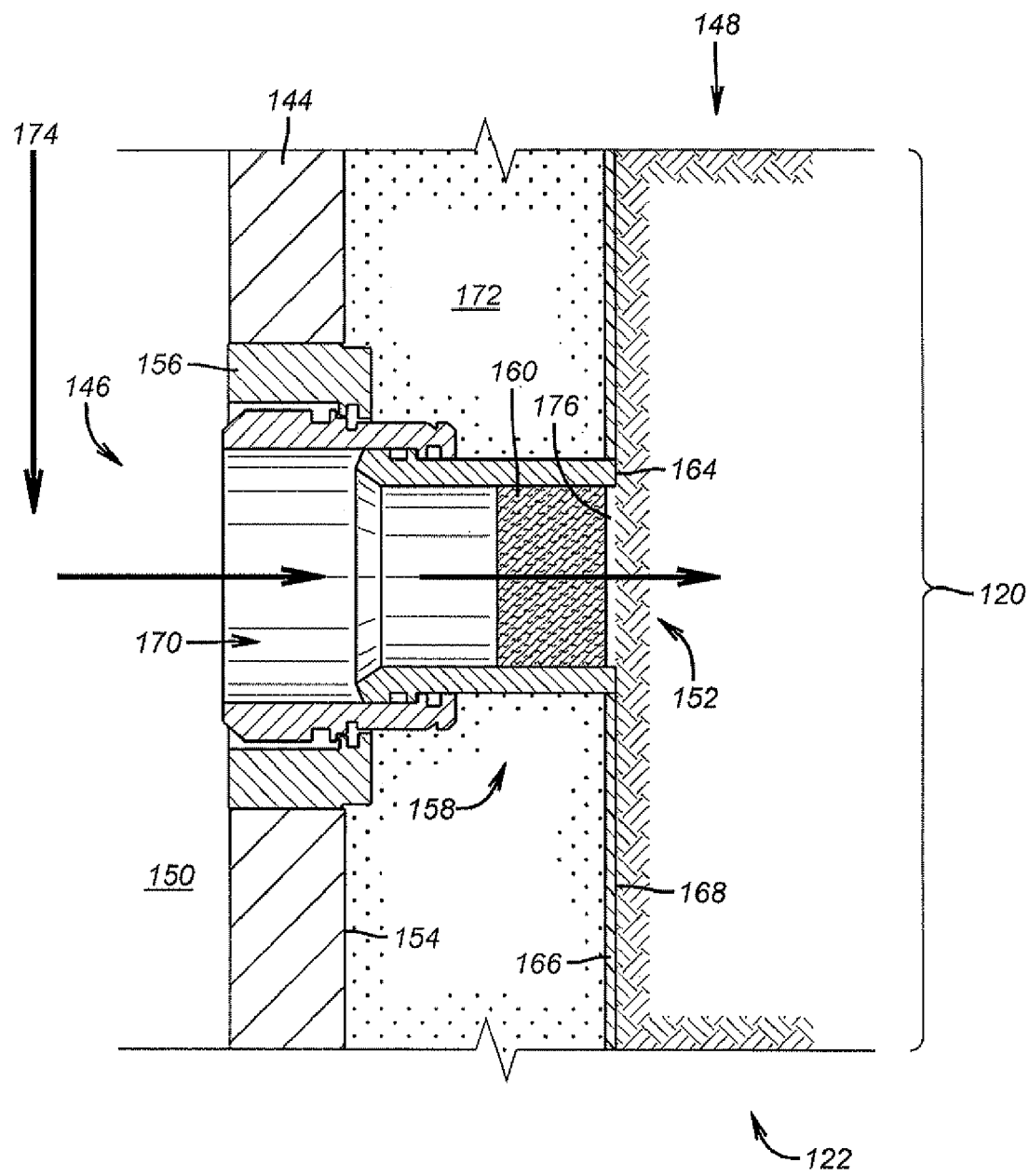
FIG. 6 is a schematic of the well in an injection mode.
Figure 7A:
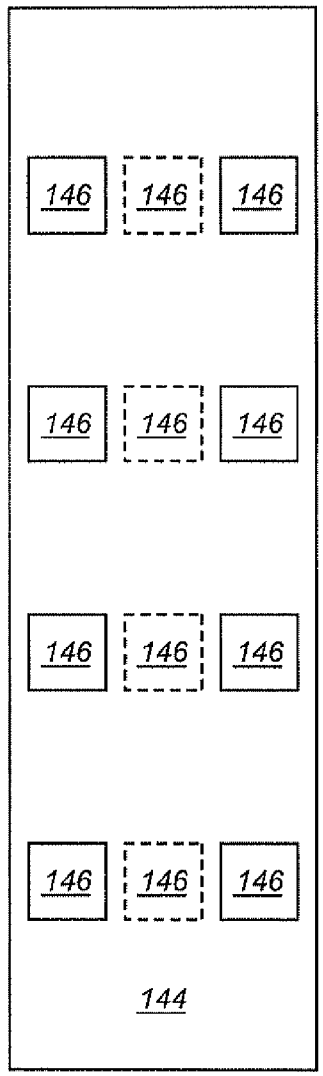
FIGS. 7A, 7B and 7C show different configurations of the array of extendable assemblies.
Figure 7B:
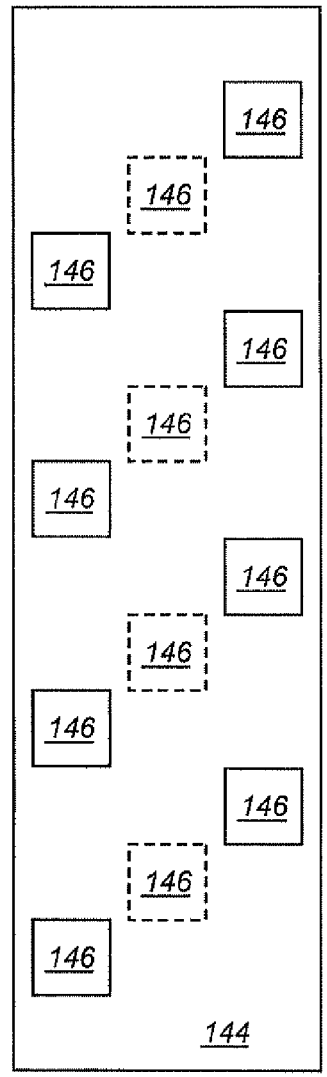
Figure 7C:
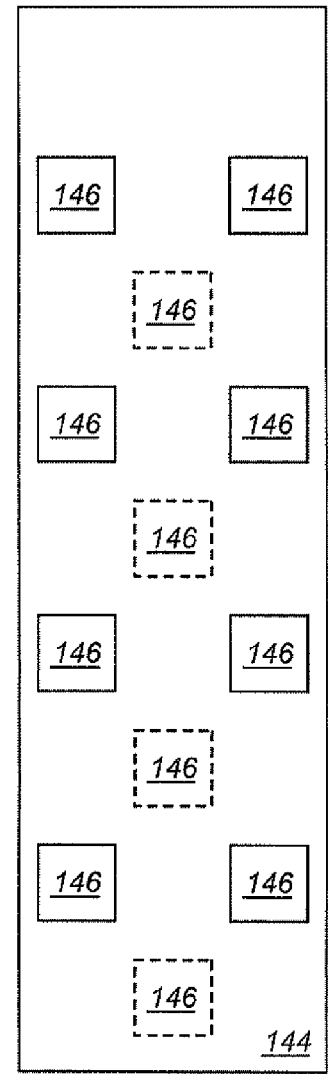

Referring now to FIGS. 3, 4, 5, 6 and 7A-C, an enlarged section 148 of the injection zone 120 is shown including an extendable assembly 146. As shown in FIGS. 7A-C and as previously discussed, one or more extendable assemblies 146 are positioned in the casing 144 in a spaced apart configuration designed to form a corresponding spaced apart configuration of conduits from an interior 150 of the casing 144 to sites 152 in the injection zone 120 adjacent the assemblies 146. The number of extendable assemblies 146 will depend on the injectivity requirements of the well borehole. It is anticipated that twelve extendable assemblies per foot of injection zone will be adequate for most applications; however, more or less members per foot can be used, with the limitation on maximum number being controlled by maintaining sufficient casing strength so that the casing can be run. Three illustrative configurations of 12 extendable assemblies 146 per foot of the casing 144 are shown in FIGS. 7A-C

Figure 3:
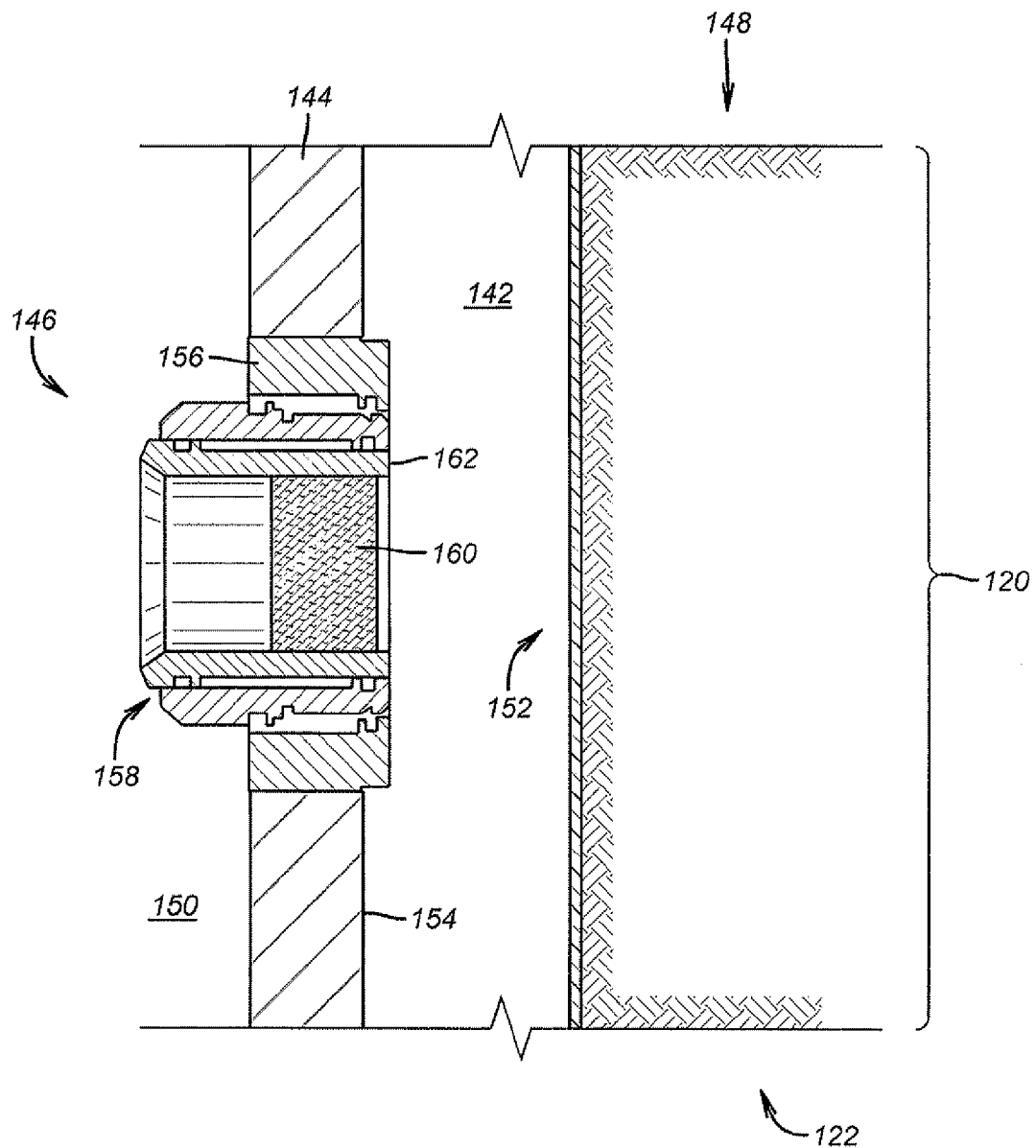
FIG. 3 is a schematic that illustrates running the extendable devices on the casing and positioning them across from the injection zone.

Looking at FIG. 3, an extendable assembly 146 in the run in position is shown. The extendable assembly 146 is built into the casing 144. The annulus 142 (now between the casing 144 and the borehole 118) may be filled at this point with "Drill-In Fluid" or the "Drill-In Fluid" displaced with a solids free fluid. The extendable assembly 146 extends out past an exterior wall 154 of the casing 144 and extends inward into the interior 150 of the casing 144. The extendable assembly 146 includes a fixed portion 156 and a moveable portion 158 having a sand control or filter media 160 located in a distal portion 162 of the moveable portion 158. The fixed portion 156 is anchored into the casing 144 and supports the moveable portion 158, so that the moveable portion 158 can telescope out past the exterior surface 154 of the casing 144 toward the site 152 in the injection zone 120.

Figure 4:
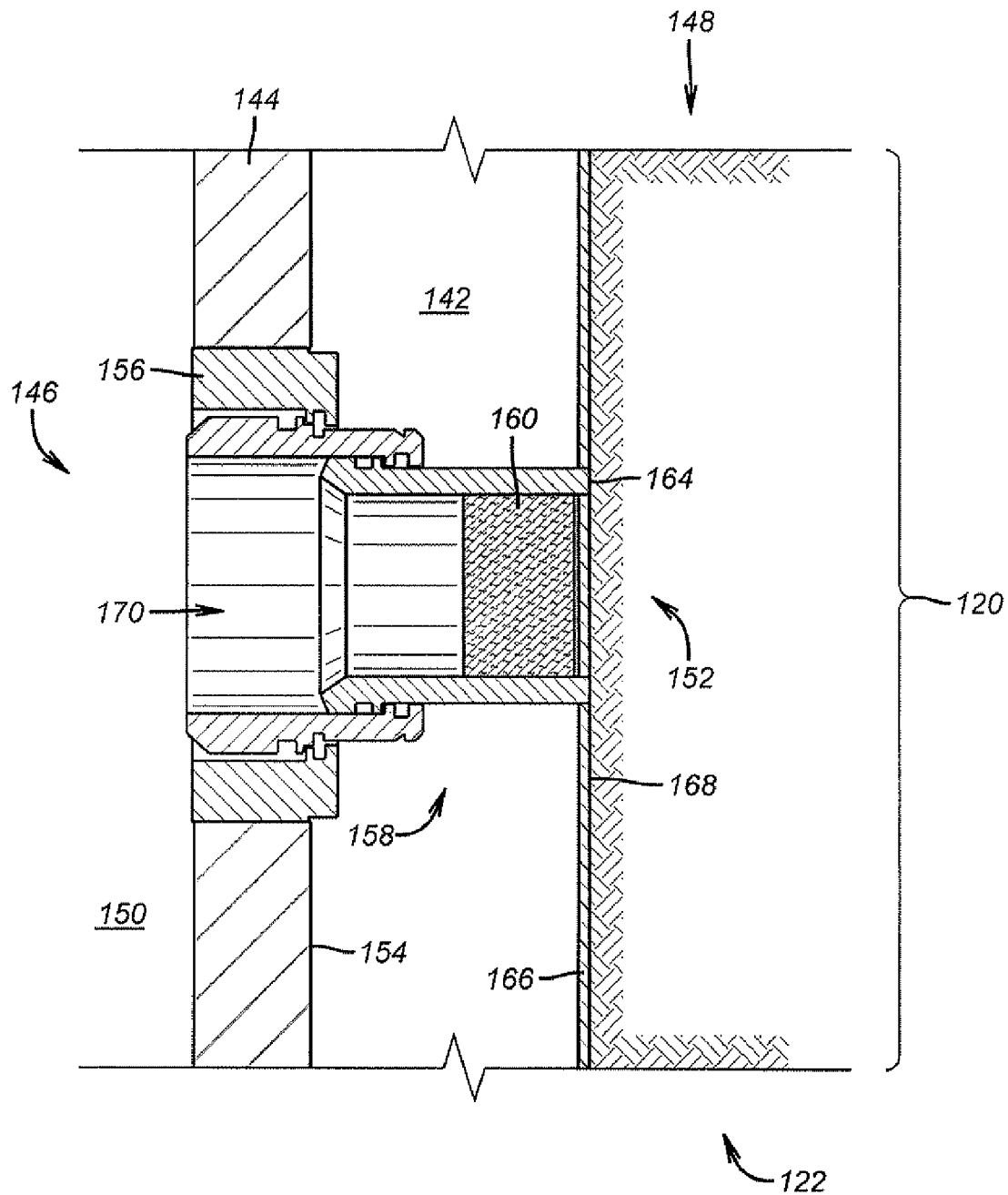
FIG. 4 is a schematic that illustrates extending the devices to contact the formation face and centralize the casing.
Figure 5:
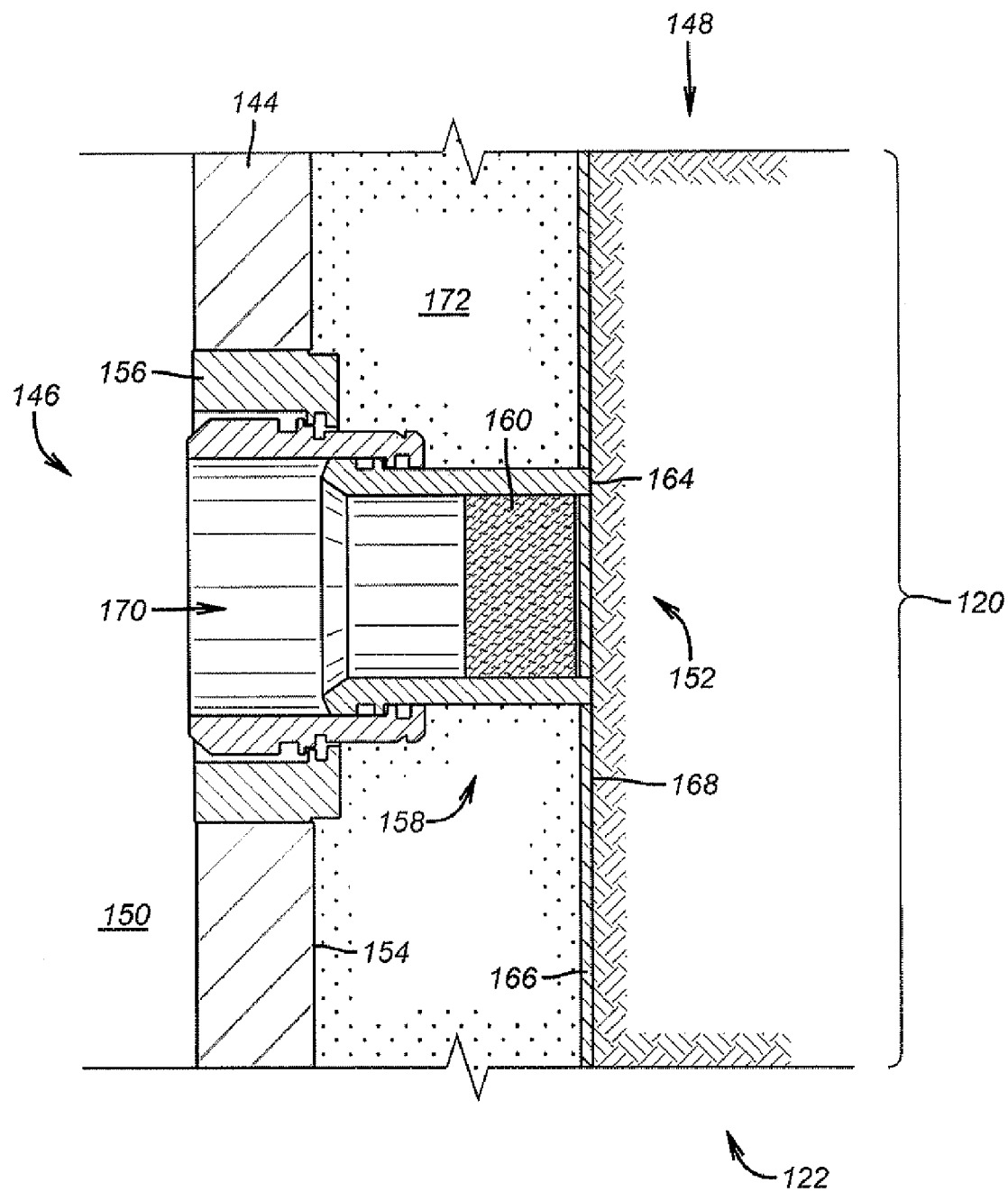
FIG. 5 illustrates the casing been cemented into place.

Looking at FIG. 4, the movable portion 158 is extended by means of hydraulic pressure bringing its distal end 164 into direct contact with a filter cake 166 associated with a face 168 of injection zone 120 adjacent the extendable assembly 146, where the filter cake 166 protects the injection zone 120. The extended moveable portion 158 forms a conduit 170 between the interior 150 of the casing 144 and the injection zone 120. The production casing 144 is now ready to be cemented in the well borehole 118. Looking at FIG. 5, the annulus 142 is filled with cement 172 isolating the injection zone 120 from fluid flow except through the conduit 170 formed by extendable assembly 146. At this point, injection tubing/equipment is run into the well and the well is made ready for fluid injection.

Referring now to FIG. 6, a fluid 174 is injected into formation 122 through the conduit 170 formed by the extendable assembly 146. It should be noted that the injected fluid 174 into the formation 122 has removed a portion 176 of filter cake 168 constrained by the extendable assembly 146. The injected fluid 174 is pumped down the injection tubing and into the casing 144 and eventually enters the conduit 170 formed by the extendable assembly 146. The injected fluid 174 then travels through the conduit 170 formed by the extendable assembly 146 and into the formation 122. Of course, each extendable assembly 146 operates in an analogous manner so that a conduit is formed for each extendable assembly 146 conforming to the patterns of the extendable assemblies mounted in the casing. It should also be recognized that the injected fluid 174 may be hazardous or corrosive in nature. Should injection rates not reach desired levels without exceeding the formation fracture pressure, the fracture pressures may be exceeded without fear that formation material will slough into the well borehole 118 because the formation is only assessable via the conduits 170 formed by the extendable assemblies 146 and the injected fluid 174 maintains a flow into the formation 122 through the conduits 170 resisting flow into the borehole 118 or casing 144.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

The invention claimed is:

1. A method of injection well construction comprising:
   drilling a borehole through an injection zone of a formation having formation fluid therein;
   running, into the borehole, casing including an extendable assembly comprising a fixed portion and a moveable portion having a filter media at its distal end so that the extendable assembly is positioned adjacent a site in the injection zone;
   providing a production well in the formation discrete from said borehole;
   extending the moveable portion of the extendable assembly to contact the formation forming a conduit between an interior of the casing and the formation; and
   injecting fluids into the well through the conduit to drive said formation fluid to said production well.

2. The method of claim 1, further comprising the step of: cementing the casing in place after the extending step, but before the injecting step.

3. The method of claim 1, wherein an injection pressure exceeds a fracture pressure of the injection zone.

4. The method of claim 1, wherein the casing further includes a plurality of extendable assemblies so that each assembly is positioned adjacent a site in the injection zone.

5. The method of claim 4, wherein the plurality comprises between about 2 and about 20 of extendable assemblies per square foot of casing within the injection zone.

6. The method of claim 4, wherein the plurality comprises between about 1 and about 12 of extendable assemblies per square foot of casing within the injection zone.

7. The method of claim 4, wherein the plurality comprises between about 1 and about 4 of extendable assemblies per square foot of casing within the injection zone.

8. A method of injection well construction comprising:
   drilling the well with a conventional drilling fluid to a point above a target injection zone;
   displacing the conventional drilling fluid with a "Drill-In Fluid;" drilling the remaining borehole through the injection zone;
   running, into the borehole, casing including an extendable assembly comprising a fixed portion and a moveable portion having a filter media at its distal end so that the extendable assembly is positioned adjacent a site in the injection zone;
   extending the moveable portion of the extendable assembly to contact the formation forming a conduit between an interior of the casing and the formation;
   injecting fluids into the well through the conduit;
   displacing, with said injecting, fluids in the formation into a production well that is discrete from said borehole for production to the surface.

9. The method of claim 8, further comprising the step of: cementing the casing in place after the extending step, but before the injecting step.

10. The method of claim 8, wherein an injection pressure exceeds a fracture pressure of the injection zone.

11. The method of claim 8, wherein the casing further includes a plurality of extendable assemblies so that each assembly is positioned adjacent a site in the injection zone.

12. The method of claim 11, wherein the plurality comprises between about 2 and about 20 of extendable assemblies per square foot of casing within the injection zone.

13. The method of claim 11, wherein the plurality comprises between about 1 and about 12 of extendable assemblies per square foot of casing within the injection zone.

14. The method of claim 11, wherein the plurality comprises between about 1 and about 4 of extendable assemblies per square foot of casing within the injection zone.

15. An injection system comprising:
 a well borehole extended into and through an injection zone of a productive formation,
 a casing run into the borehole and including an extendable assembly comprising a at least one member having a fixed portion and a moveable portion having a filter media at its distal end so that the extendable assembly is positioned adjacent a site in the injection zone and subsequently extended into the injection zone to form a conduit from an interior of the casing to the formation
 a fluid system for injecting a fluid into the formation through the casing and out said conduit; and
 a production well discrete from said borehole in communication with the formation to receive formation fluids displaced by said fluid system.

16. The system of claim 15, wherein the casing further includes a plurality of extendable assemblies so that each assembly is positioned adjacent a site in the injection zone.

17. The system of claim 16, wherein the plurality comprises between about 2 and about 20 of extendable assemblies per square foot of casing within the injection zone.

18. The system of claim 16, wherein the plurality comprises between about 1 and about 12 of extendable assemblies per square foot of casing within the injection zone.

19. The system of claim 16, wherein the plurality comprises between about 1 and about 4 of extendable assemblies per square foot of casing within the injection zone.

* * * * *